US006302266B1

(12) United States Patent
DeFrancisco et al.

(10) Patent No.: US 6,302,266 B1
(45) Date of Patent: Oct. 16, 2001

(54) CONVEYOR CONTROL SYSTEM EMPLOYING ZONE CONTROL MODULE

(75) Inventors: Christopher J. DeFrancisco, Battle Creek; Mark T. Fisher, Richland, both of MI (US)

(73) Assignee: Humphrey Products Company, Kalamazoo, MI (US)

( * ) Notice: Subject to any disclaimer, the term of this patent is extended or adjusted under 35 U.S.C. 154(b) by 0 days.

(21) Appl. No.: 09/232,876

(22) Filed: Jan. 15, 1999

(51) Int. Cl.$^7$ .................................................... B65G 13/06
(52) U.S. Cl. .................................... 198/781.06; 180/460.1
(58) Field of Search .............................. 198/781.06, 460.1

(56) References Cited

U.S. PATENT DOCUMENTS

| 4,534,462 | * | 8/1985 | Hoover ................................. 198/781 |
| 4,798,282 | * | 1/1989 | Sperduti et al. ...................... 198/781 |
| 5,086,910 | * | 2/1992 | Terpstra ................................ 198/572 |
| 5,191,967 | * | 3/1993 | Woltjer et al. ........................ 198/781 |
| 5,318,167 | * | 6/1994 | Bronson et al. ...................... 198/577 |
| 5,486,691 | * | 1/1996 | Dieterle . | |
| 5,906,268 | * | 5/1999 | Kalm ................................ 198/781.06 |
| 6,035,999 | * | 7/1998 | Hall ................................ 198/781.06 |

OTHER PUBLICATIONS

Application Notes for Sick Optic–Electronic products "WTR—Photoelectric Proximity Sensors for Roller Conveyors", Sick AG, Germany, 1996 Date, 2 pages.*
Wenglor® Sensoric GmbH Catalog on photoelectric sensors, 1998 Publication, Title page and 7 pages.*

Hytrol "EZLogic™ Accumulation System" EZLogic™ Accumulation System—Product Overview 1996 Publication, 3 pages.*
Hytrol Introduces "EZ Logic™ Accumulation System" Features of the EZLogic™ Accumulation System 1997 Publication, 12 pages.*
Application Notes for Sick Optic–Electronic products, "WTR—Photoelectric Proximity Sensors for Roller Conveyors", Sick, AG, Germany, Facsimile Date of 1996, 3 pages.*

* cited by examiner

*Primary Examiner*—Christopher P. Ellis
*Assistant Examiner*—Rashmi Sharma
(74) *Attorney, Agent, or Firm*—Rader, Fishman, Grauer & McGarry, an Office of Rader, Fishman & Grauer PLLC (57) ABSTRACT

A zone control module for a conveyor system includes a manifold unit having oppositely facing first and second surfaces. A valve unit is mounted to the first surface of the manifold unit and includes an electrical valve actuator and a movable valve element. An electrical control unit mounts to the second surface of the manifold unit and is spaced from the valve control unit by the manifold unit. The valve unit includes first and second conductors extending into conductive apertures in the manifold unit for electrical contact with the electrical control unit, such that electricity from the electrical control unit can be transferred to operate the valve unit. The control modules can be utilized with a slug module to control a conveyor. Optical sensors are used to provide drive signals for respective zones of the conveyor system. The optical sensors can be overridden by an electrical slug signal from the slug module.

15 Claims, 8 Drawing Sheets

CONVEYOR CONTROL SYSTEM EMPLOYING ZONE CONTROL MODULE

FIELD OF THE INVENTION

This invention relates to a zone control system for sensing and advancing articles in selected zones of a conveyor system and more particularly to an improved zone control module therefor.

BACKGROUND OF THE INVENTION

It is common practice to utilize conveyors for moving articles about a factory, warehouse or loading dock. Such conveyors generally include rollers, at least some of which are driven, to advance goods along respective conveyors. Prior conveyor systems have utilized air pressure to power actuators moving articles along conveyors. Some conveyor systems have optically sensed the position of articles from below conveyor rollers.

Figure 1:
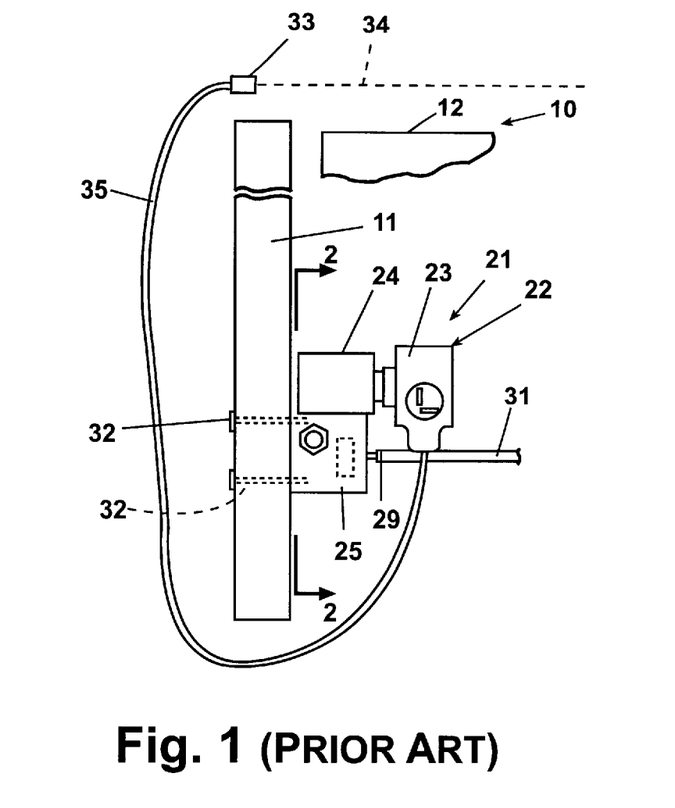
FIG. 1 is a side view of a prior art conveyor control system mounted onto a rail member of a conveyor system.
Figure 2:
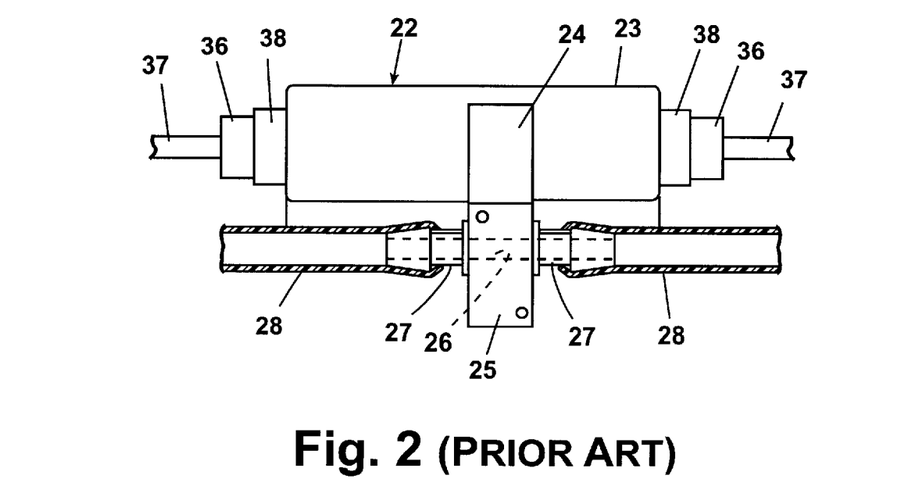
FIG. 2 is a side view of the prior art conveyor control system of FIG. 1 as viewed from line 2—2 in FIG. 1.
Figure 3:
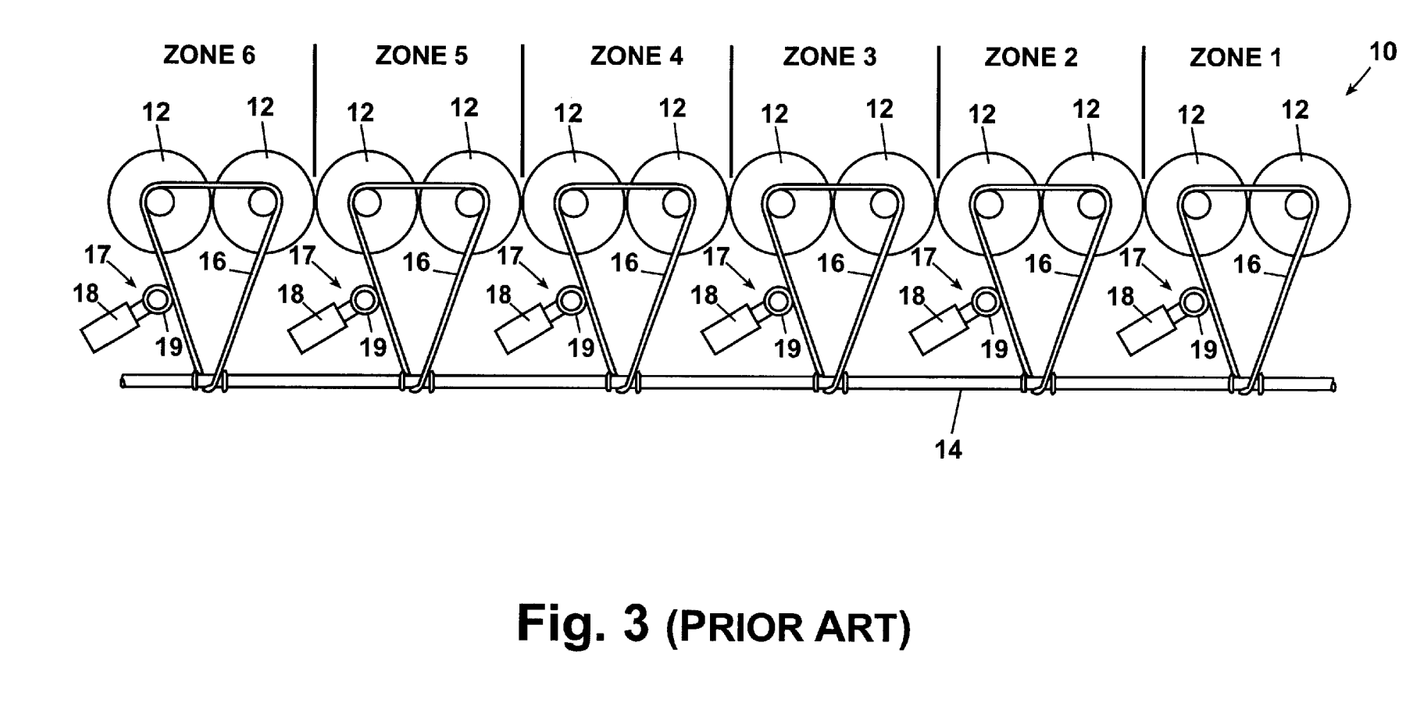
FIG. 3 is a longitudinally extending sectional side view for diagrammatically showing the zones of the conveyor.

FIGS. 1–3 illustrate parts of a known conveyor system 10 of the type extensively used in factories, warehouses and the like to permit supporting and advancing of articles such as boxes thereon. The conveyor 10 includes power-driven article support elements such as rollers 12 which are disposed to define an elongate path, and the rollers are typically rotatably supported so as to extend transversely between a pair of elongate side rails, one such side rail 11 being illustrated in FIG. 1. The conveyor 10, when configured to function as an accumulating conveyor, typically has the rollers 12 defined into adjacent zones which can be independently driven from one another. For this purpose, the rollers 12 of each zone are typically independently driven from a main drive device such as a continuously driven line shaft 14 which extends lengthwise of the conveyor. The rollers 12 of the individual zones are then independently and selectively driven from the line shaft 14 through an intermediate drive transmitting device 17 which can be selectively actuated. This intermediate drive transmitting device, in the illustrated embodiment, includes an elongate twisted belt 16 which is engaged between the line shaft 14 and drive hubs associated with one or more of the rollers 12 defining the respective zone. The drive belt 16 in turn has an actuator 18 associated therewith for appropriately tensioning or de-tensioning the drive belt. The actuator 18 in the illustrated embodiment includes an extendable and contractible fluid pressure device such as an air cylinder, the latter causing appropriate extension or contraction of a wheel 19 which contacts the drive belt 16 and can be moved into or away from the drive belt to effectively tension or de-tension same. By tensioning the drive belt 16, the frictional contact between the drive belt and the drive rollers 12 and line shaft 14 is sufficiently increased to effect driving rotation of the rollers 12, whereas conversely when the belt is de-tensioned the drive belt slips relative to the line shaft so that the rollers of the respective zone are not driven.

The general arrangement of the conveyor as described above, when used as an accumulating and advancing conveyor, permits individual articles to be supported on and advanced from zone to zone without permitting the articles to contact or stack against one another. This advancing of the articles from zone to zone is facilitated by a conveyor control system 21 which includes a series of zone control modules 22, only one of which is shown in FIGS. 1 and 2, disposed serially along the conveyor for controlling the individual zones.

In the known control system 21 illustrated by FIGS. 1 and 2, the zone control module 22 includes an optical sensor 33 which is disposed so as to project a sensing path 34 transversely across the rollers of an adjacent downstream zone so as to sense the presence or absence of an article in the zone which is located downstream from the zone being controlled by the respective control module 22. When the sensor 33 senses the absence of an article or box in the adjacent downstream zone, it transmits a signal to the controller 22 which in turn supplies pressure fluid to the air actuating device 18 associated with the adjacent upstream zone to activate the rollers 12 so that an article in the upstream zone is advanced into the adjacent downstream zone. Due to the presence of such control modules 22 being located in series and controlling the respective zones, articles can be sequentially advanced from zone to zone.

The control module 22 of the prior art, as shown by FIGS. 1 and 2, include an electrical unit 23 which plugs into an electrical solenoid unit 24, and the latter is fixedly secured to and operates a shiftable valve which is positioned interiorly of a manifold/valve unit 25. A cable 35 electrically connects the optical sensor to the electrical unit. The electrical control units 23 of serially adjacent modules 22 are in turn electrically interconnected by electrical conductors 37 which have plugs 36 at opposite ends for joining to connector parts 38 provided on opposite ends of the units 23 so as to electrically connect the adjacent control modules.

In similar fashion the valve/manifold unit 25 has a through flow passage 26 which terminates at connector hubs 27, and the adjacent modules 22 are joined together in fluid communication by fluid supply lines 28 connected to the hubs 27. The serially-connected fluid supply lines at a remote end are joined to an appropriate source of pressurized fluid, typically air. The unit 25 has a load port 29 which connects to a line 31 which in turn connects to the actuator device 18.

The control module, as illustrated by FIGS. 1 and 2, is typically fixedly secured to an inner surface of the side rails 11, such as by screws 32 extending therethrough and being secured directly into the housing of the valve/manifold unit 25.

With the arrangement illustrated by FIGS. 1 and 2, when the sensor 33 senses the absence of an article in the adjacent downstream zone, then a signal is transmitted to the electrical unit 23 which in turn energizes the shiftable solenoid associated with the solenoid unit 24, and this in turn activates the valve disposed interiorly of the valve/manifold unit 25. The activation of the valve permits pressurized fluid (i.e. air) from the supply line to pass through the valve to the fluid actuator 18 so that the belt associated with the upstream zone is tensioned to effect driving of the rollers 12 of the upstream zone, thereby permitting any article in the upstream zone to be advanced forwardly along the conveyor for movement into the adjacent downstream zone.

While the system described above relative to FIGS. 1–3 has generally operated in a satisfactory manner, nevertheless the construction thereof has possessed disadvantages. The construction of the module and the interrelationship between the units and the mounting thereof on the frame rail of the conveyor have made it difficult to service and maintain the arrangement. For example, if the valve/manifold unit requires repair or replacement, then the entire module must be removed to permit such repair, and then remounted on the side rail. Further, access to the solenoid unit is also difficult because of the overall constructional and positional restraints on the system, and thus any replacement or servicing thereof substantially requires removal of the entire module.

With the conveyor control arrangement of FIGS. 1–3, it is occasionally necessary or desirable to simultaneously activate a series of zones so as to permit simultaneous advancing of all objects or articles therein, this being referred to as "slug" advancing movement. To permit the simultaneous movement of a "slug" or series of articles, the control system of FIGS. 1 and 2 has the discharge port associated with each valve/manifold unit 25 connected to a discharge line. The discharge lines of the series of modules in turn connect to and discharge through a control valve which under normal conditions is maintained open to permit the normal discharge of air. This control valve is also connected to a slug line which in turn connects to a source of pressurized air. When slug movement is desired, the control valve is activated so that the discharge lines are closed off from the atmosphere, but instead are connected to the slug pressure line. The pressurized air in the slug pressure line is thus fed through the discharge lines to the discharge ports of the valve/manifold units, and is then fed through the valves to the pressure actuators 18 associated with the driving devices 17 associated with the series of zones, thereby permitting simultaneous driving of the rollers 12 in all of the zones defining the slug series. This slug movement is terminated by returning the control valve to the position wherein the slug pressure line is closed off and the discharge line are again vented. This known slug arrangement, however, significantly complicates the overall construction and specifically the pneumatic piping of the system.

Another prior art conveyor control device includes an optical sensor mounted below the rollers and angled upwardly to sense the presence or absence of articles through a gap between rollers. The optical sensor automatically closes a solenoid valve, turning off a section of the conveyor to avoid a collision when articles moving down the conveyor approach another article. The manner of mounting the device and the optical sensor therefore makes it difficult to accurately detect the presence of all articles on the conveyor.

Thus, it is an object of the invention to provide a conveyor control system which overcomes and/or improves on the disadvantages associated with the above prior art systems.

More specifically, this invention relates to a conveyor control system with simplified installation of the required wiring and plumbing, which system includes a control module having easy access and removal of the valve control unit without disturbing the manifold unit, and which can be used with a slug module to provide a simplified slug mode of operation.

SUMMARY OF THE INVENTION

Summarizing the invention, a conveyor control system includes a zone control module provided with a manifold unit, a valve unit, and an electrical control unit. The electrical control and valve units preferably are detachably mounted to oppositely facing sides of the manifold unit, and the latter is preferably attached to the conveyor frame structure. Such arrangement provides easy access to the electrical control and/or valve units without disturbing or requiring removal of the manifold unit and the fluid supply lines secured thereto.

An embodiment of the invention also includes an electrical slug module for controlling the zone control modules. An electrical slug signal is supplied by a third conductor included with first and second power supply conductors integrated into electrical connectors in series between the control modules to supply power to and control the valves of the individual zone control modules. The valves can be simultaneously activated to supply fluid pressure to corresponding actuators to simultaneously drive all of the rollers of the conveyor system in zones controlled by the slug module. Further, the number of zones controlled by the slug module can be adapted or changed merely by providing a slug terminator as an electrical connector between adjacent zone control modules, which slug terminator has an open circuit for the slug signal line.

Other objects and purposes of the invention will be apparent to persons familiar with arrangements of this general type upon reading the following specification and inspecting the accompanying drawings.

Certain terminology will be used in the following description for convenience and reference only, and will not be limiting. For example, the words "upwardly", "downwardly", "rightwardly" and "leftwardly" will refer to directions in the conveyor system of the drawings to which reference is made. The words "inwardly" and "outwardly" will refer to directions toward and away from, respectively, the geometric center of the system and designated parts thereof. Said terminology will include the words specifically mentioned, derivatives thereof, and words of similar import.

DETAILED DESCRIPTION

Figure 5:
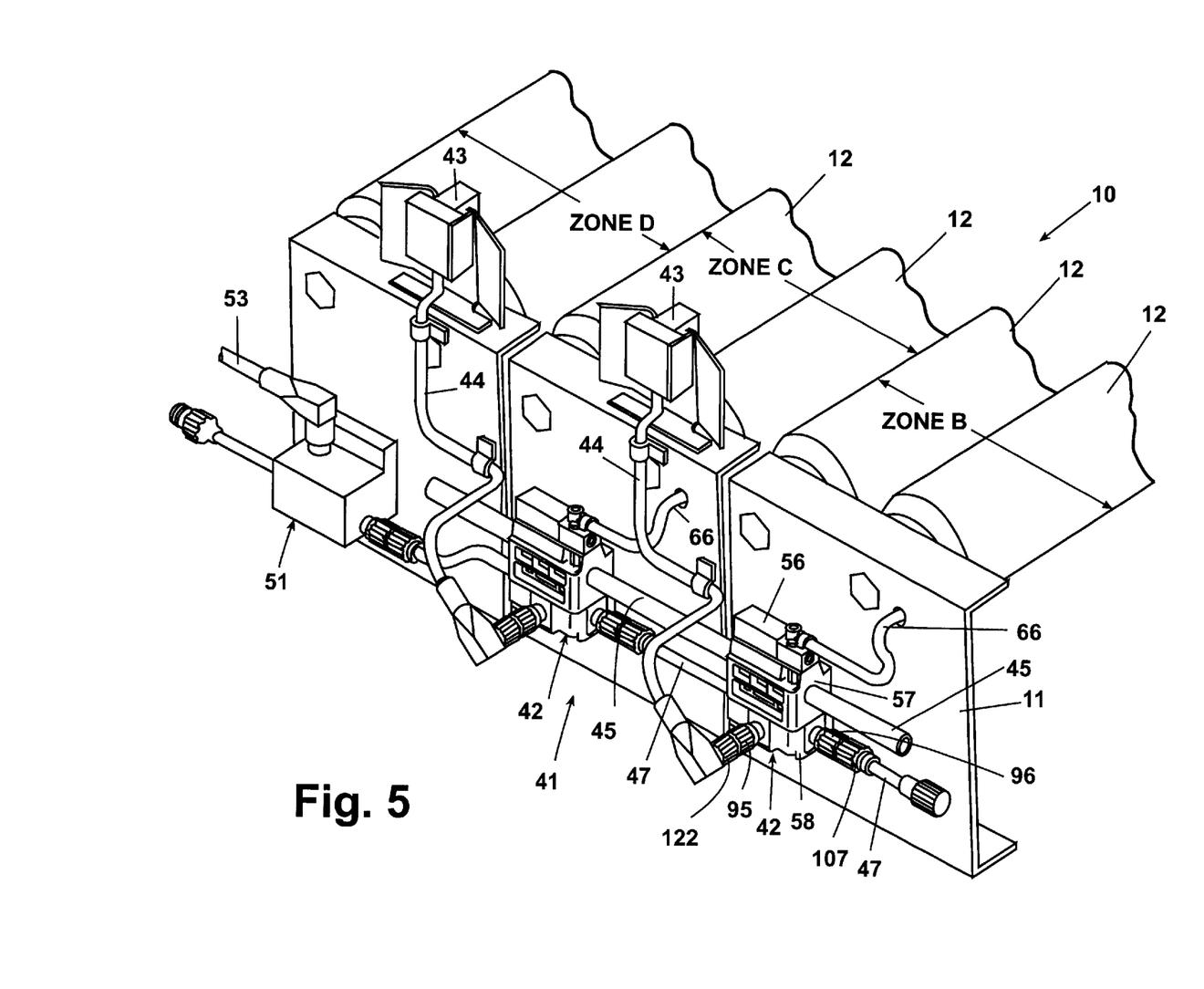
FIG. 5 is an isometric view of a portion of an improved conveyor control system according to the present invention and shown mounted on a roller conveyor.
Figure 6:
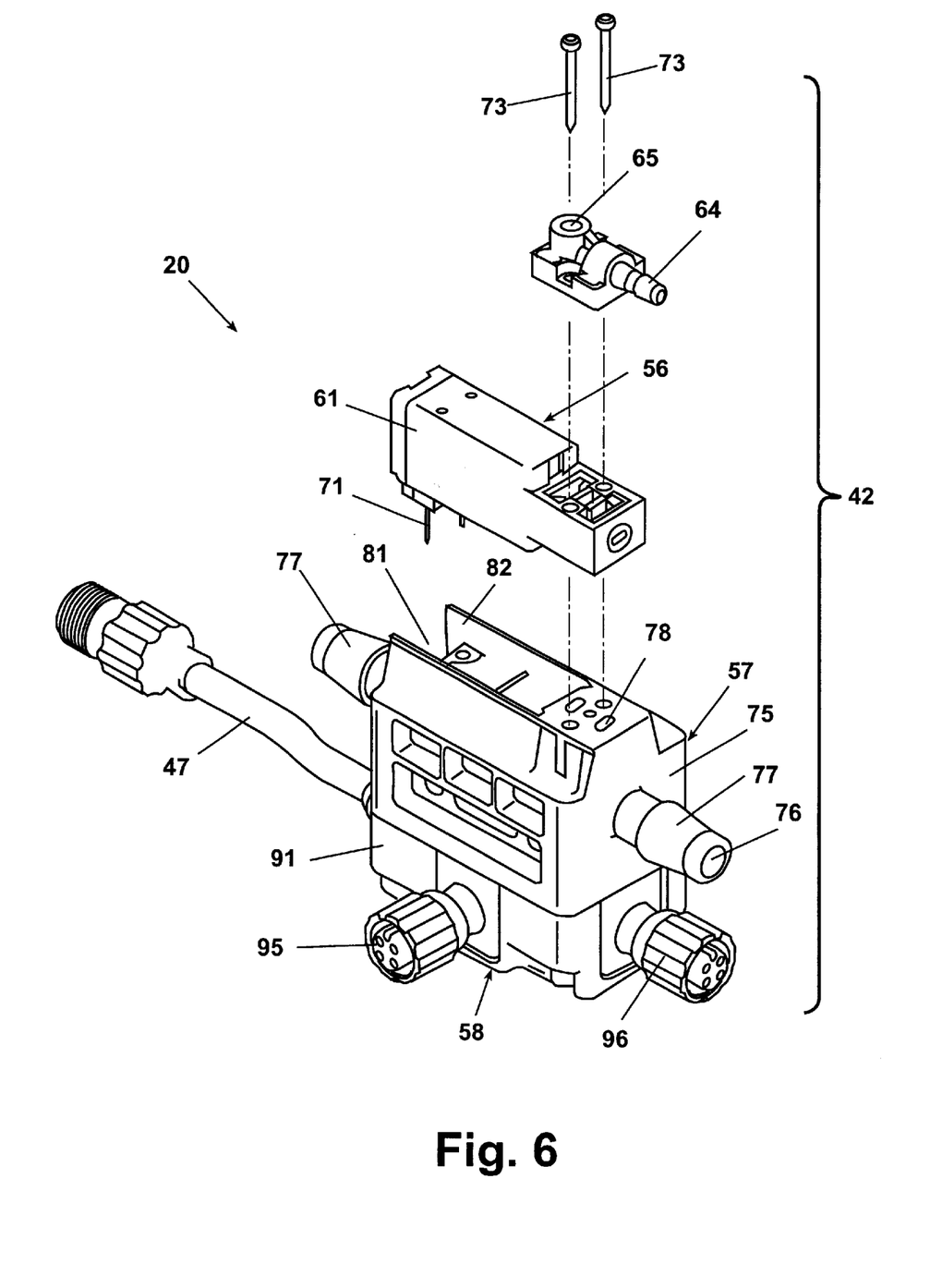
FIG. 6 is an isometric view of the zone control module having the valve control unit separated therefrom.
Figure 7:
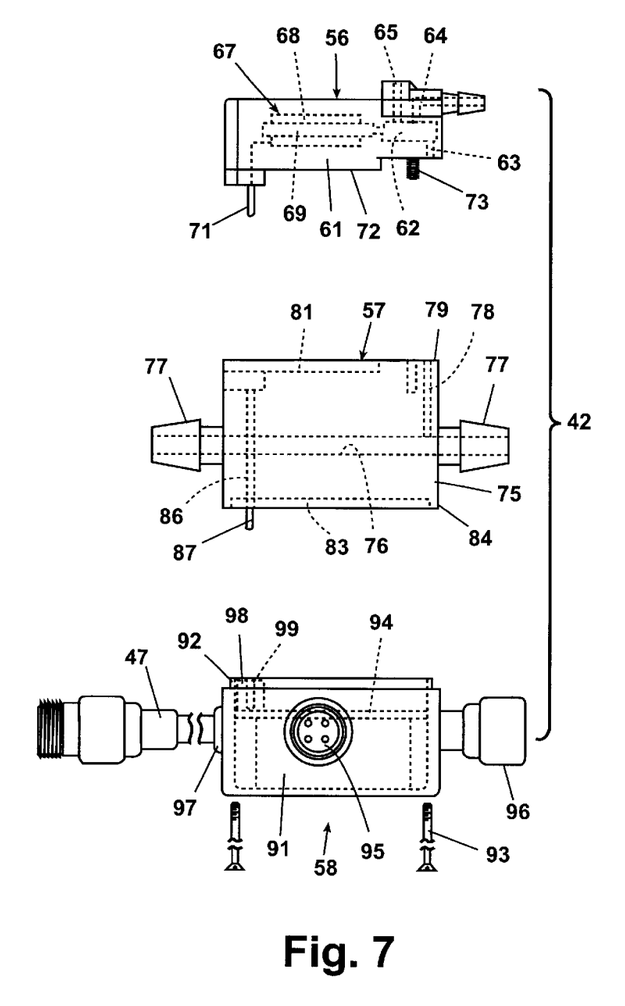
FIG. 7 is an exploded side view of the zone control module.
Figure 8:
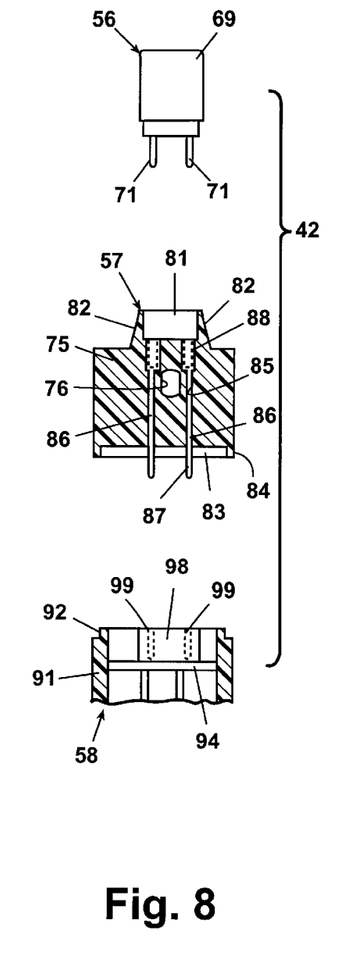
FIG. 8 is an exploded end view, partially in cross section of the control module as shown in FIG. 7.

Referring to FIG. 5, there is illustrated a conveyor system 10 which incorporates therein an improved control system 41 for permitting transporting and intermittent advancing movement of articles from zone to zone. The conveyor system 10 incorporates therein much of the conventional structure described above with respect to FIGS. 1 and 3, and accordingly the same reference numerals are utilized for designating the corresponding conventional parts of the conveyor.

Figure 4:
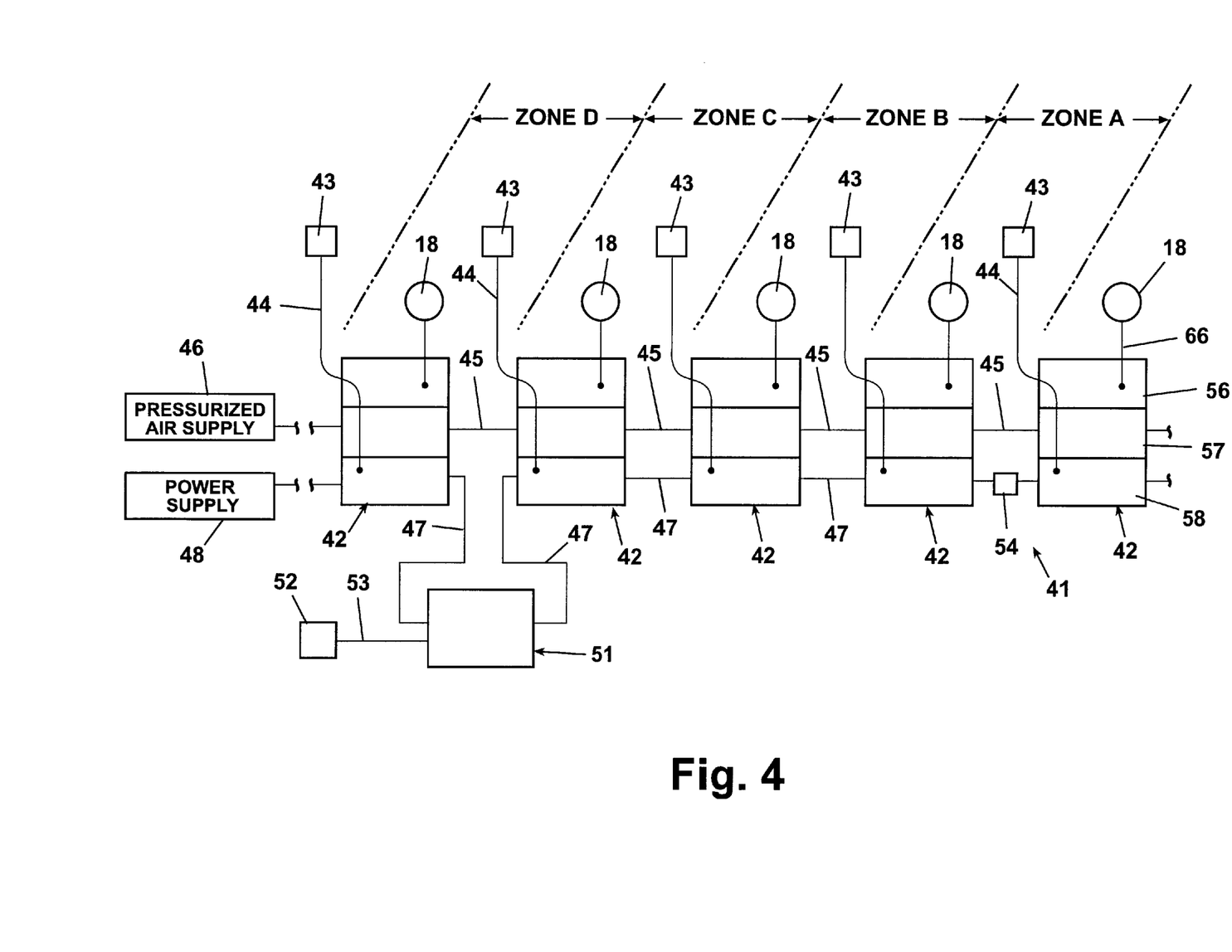
FIG. 4 is a block diagram of a conveyor control system according to the present invention and showing the arrangement between various components thereof.

Considering the improved conveyor control system 41 of this invention, and referring to FIG. 4, the control system includes a plurality of individual zone control modules 42 which are serially connected, both pneumatically and electrically, longitudinally along the conveyor so that each module 42 corresponds to and controls a respective zone on the conveyor, which zones are diagrammatically depicted as zones A, B, etc. in FIGS. 3 and 4 for illustrative purposes. The serially interconnected zone control modules 42 are substantially identical, and each comprises a small and compact structure which is defined primarily by three sub-modules or units which are directly fixedly but releasably interconnected.

More specifically, each zone control module 42 includes a valve unit 56, a manifold unit 57 and an electrical control unit 58. These three units are substantially vertically stacked together so that the manifold unit 57 is fixedly but releasably sandwiched between the valve and electrical units.

The manifold unit 57, as shown in FIGS. 4–8, includes an elongate blocklike housing 75 having a main flow passage 76 extending longitudinally therethrough, which flow passage at opposite ends terminates in hubs or nipples 77 which project outwardly beyond opposite ends of the housing. These hubs 75 mount thereon one end of an elongate tubular conduit 45 which extends between the manifold units of serially adjacent modules. One of the modules also has a conduit connected thereto which in turn extends back to a source 46 of pressurized fluid, specifically air, whereby pressurized air is supplied through and to the manifold units 57 of all of the serially-connected modules 42.

The housing of the valve manifold has opposite side surfaces, namely respective upper and lower surfaces as illustrated in the drawings, which face outwardly in opposite directions so as to abuttingly engage opposed surfaces defined on the valve and electrical units 56 and 58 respectively. The manifold housing also has a feed passage 78 formed therein which communicates with the main passage 76 and extends transversely so as to open outwardly through the upper surface 79 for communication with the valve unit 56, as explained below.

The valve unit 56 includes an elongate and generally blocklike housing 61 which has a length corresponding generally to the length of the manifold housing 75. The valve housing 61 mounts adjacent one end thereof a shiftable valve element 62 which controls flow between an inlet passage 63, a load port 64 and a discharge port 65. The inlet passage 63 opens through the lower face of the valve housing for direct communication with the feed passage 78 in the manifold housing. The load port 64 connects to a suitable tubular line 66, such as a flexible conduit, so as to supply air to or return air from the respective zone actuating cylinder 18. The discharge port 65 permits discharge of air directly to the atmosphere, but can connect to a discharge conduit if desired or necessary. The valve 62 is normally maintained in a closed position wherein the supply port 63 is closed off, and the load and discharge ports 64, 65 directly communicate with one another. The valve 62 can be shifted linearly into an open position, however, wherein the discharge port 65 is closed off, and the supply port 63 connects directly to the load port 64.

The valve 62 is shifted from the closed to the open position by an electric solenoid actuator 67 which is disposed adjacent the other end of the valve housing 61 and which includes a conventional solenoid coil 68 disposed in surrounding relationship to a movable armature 69, the latter being coaxially coupled to the valve 62 to effect shifting movement of the latter into an open position when the coil is electrically energized. A spring (not shown) is provided for returning the valve and armature to the closed position upon de-energization of the solenoid coil, such being conventional in valve arrangements of this general type. The construction of the shiftable valve 62 and its actuation by a solenoid is conventional, whereby further description thereof is believed unnecessary.

The manifold housing 75 in the upper side thereof is formed with a stepped channel-like recess 81 which opens downwardly therein and is elongated longitudinally thereof. This channel-like recess 81 enables the lower portion of the valve housing 61 to nest therein between the manifold housing sidewalls 82 so as to permit secure seating of the valve and manifold housings one on top of the other. A suitable fastener 73 such as a screw extends downwardly through the valve housing 61 for threaded engagement with the manifold housing 75 to permit fixed but releasable attachment of the valve unit 56 to the manifold unit 57.

Considering the electrical control unit 58, it includes a generally hollow boxlike housing 91 which is open on one side so as to permit containment of the electrical components therein. This housing 91 is disposed so that a rim 92 on the free edge thereof seats into a shallow recess 83 surrounded by a flange 84 as defined on the bottom side surface of the manifold housing 75. The flange 84 effectively allows the rim 92 of the electrical control housing to nest therein. The electrical control housing 91 in turn is fixedly but detachably joined to the manifold housing 75 by fasteners 93 such as screws which project through the control housing and thread into the manifold housing. The electrical control unit housing 91 mounts therein, substantially adjacent the lower side of the manifold housing, a circuit board 94 on which appropriate electrical control circuitry is provided, as explained hereinafter.

The electrical control unit 58 also includes electrical connector parts 96 and 97, such as plugs, grommets, or sockets, which are provided on and projecting longitudinally from opposite ends of the housing 91. These connector plugs 96, 97, in this example, are electrically joined to the circuit board for transmission of electrical energy to and through the electrical control unit. The connector plugs 96, 97 are releasably engaged to flexible electrical connectors 47 which extend between and couple to the connector plugs of serially-connected modules 42 for permitting transmission of electricity therebetween. The endmost zone module 42 in turn has the electrical unit thereof joined to an electric connector which in turn joins to an electrical power source 48, preferably a direct-current power source such as 24-volt direct current.

The electrical connector 47 preferably defines therein three electrical conductors, the first conductor 104 (FIG. 9) supplying the DC voltage to the electrical units 58 of the serially-arranged modules 42, the second conductor 106 being a ground conductor, and the third conductor 105 being a signal conductor for use when "slug" operation of the conveyor is desired, as explained hereinafter.

The control unit 58 also includes a further connector part 95 which is accessible exteriorly from one side thereof, which connector may involve any type of conventional plug-in, jack-type or socket-type electrical connector, for releasable connection to one end of a flexible signal transmitting line 44, the latter having an optical sensor 43 provided at the other end thereof and mounted so as to project a sensing sight line transversely across the conveyor generally slightly above the upper surfaces of the rollers for sensing the presence of an object or article within the respective conveyor zone. The line 44 has a connector part 122 for releasable attachment to the connector part 95.

To permit transmission of electricity from the electrical control unit 58 to the valve unit 56, the manifold housing 75 has a pair of transverse openings 85 extending therethrough adjacent one end thereof. These openings fixedly mount therein a pair of elongate electrically-conductive pins 86 which extend transversely through and are fixedly mounted on the manifold housing. These conductive pins 86 at the upper ends define upwardly-opening cuplike sockets 88. The pins at the lower ends have parts 87 which project downwardly in cantilevered fashion a limited extent below the lower surface of the manifold housing. These downwardly projecting pin parts 87 in turn plug into upwardly-projecting electrical sockets 99 which are defined in a connector part 98 which is mounted on and projects upwardly from the circuit board 94 associated with the electrical control unit 58 when the electrical control and manifold units are engaged one with the other.

In similar fashion, the solenoid 67 of the valve unit 56 has a pair of conductive pins 71 associated therewith and secured so as to project in cantilevered manner downwardly from the lower surface 72 of the valve housing. These pins 71 align with and project into the cuplike sockets 88 associated with the conductors 87 on the manifold housing 75 when the valve and manifold units are joined together. In this manner the electrical control and valve units individually have a releasable plug-type electrical engagement with the conductive elements 87 which are mounted on and extend transversely through the manifold housing 75 so as to permit direct transmission of electrical energy from the control unit 58 to the valve unit 56, while at the same time permitting each of the valve and control units 56 and 58 to be easily detached from the manifold unit 57.

Connector parts 95, 96, 97 of electrical control unit 58 may be plug-type connectors having at least three conductive pin elements, but other types of connector parts, either separable or permanently joined, can be utilized having the equivalent of three or more conductive elements as is well known in the electrical arts.

The electrical circuitry associated with the zone control module 42, which circuitry is associated with the electrical control unit 58 and is provided on the circuit board 94 and by the electrical connector parts associated therewith, will now be briefly described with reference to FIG. 9.

The circuitry includes three conductors 101–103 which enable the three electrical conductors 104–106 associated with the electrical connectors 47 to be connected to and pass through each of the modules 42. These three conductors include the main voltage supply conductor 101 which joins to the conductor 104 of the connectors 47, a ground conductor 103 which joins to the conductor 106 of the connectors 47, and a slug line conductor 102 which joins to the conductor 105 of the connectors 47. This arrangement enables electric power to be supplied to and through each of the zone modules 42 which are connected in series.

The circuitry also includes conductors 111 and 112 which respectively connect to the power and ground conductors 101 and 103. The conductors 111 and 112 also join to the connector part 95, and thus join to the sensor signal transmitting line 44. The sensor 43, in the arrangement illustrated by FIG. 9, comprises a transistor 121 which is open (that is, no signal) when an article is present in the conveyor zone being sensed. When no article is present, however, then the optical sensor closes the path through the transistor 121 between the conductors 113 and 112, thus essentially closing the circuit path from the conductor 113 to the ground conductor 103, whereby transistor 121 thus effectively grounds the conductor 113 except for a small voltage drop across the collector-to-emitter of the transistor. The previously open conductor 103 now enables current to pass from power conductor 101 through conductor 114 to one of the conductive pins 71, thence through solenoid coil 68 to the other conductive pin 71, and thence to the conductor 113, through diode D3, which now connects through conductor 112 to the ground conductor 103. This hence energizes the solenoid coil 68 which shifts the valve element 62 into an open position, thereby enabling pressurized fluid from the manifold unit to flow through the valve to the respective zone driving actuator 18. At the same time, a resistor R1 and a light emitting diode D4 are connected in parallel with the solenoid coil 68 so that current passing through this parallel line activates the light emitting diode D4 to visually indicate that the rollers of the respective zone are being operated. When the adjacent downstream zone acted on by the sensor 43 senses the presence of an article being moved into the zone so as to interrupt the sensor signal, then the transistor switch 121 effectively reopens, and the solenoid coil 68 is de-energized whereby the valve returns to its closed position, thus connecting the zone driving device 18 to the discharge port of the valve so as to de-pressurize the device 18 and thus stop the rotation of the conveyor rollers in the adjacent upstream zone.

While the optical sensor 43 in the illustrated embodiment comprises a transistor 121 as the sensing or switching element, it will be appreciated that the actual sensor or switching element can be of many conventional types, such as an infrared sensor or even a physical switch-type sensor positioned so as to make physical contact with the article contained in the zone.

For normal accumulating and advancing of articles on the conveyor, each of the serially-connected zone control modules 42 independently operates in the manner described above so that, upon sensing that the adjacent downstream zone is empty, the control module 42 activates its respective adjacent upstream zone so as to advance the article therein into the adjacent downstream zone, with the presence of the article in the adjacent downstream zone being sensed by the sensor so as to again de-activate the control module of the adjacent upstream zone.

With the above arrangement, each control module 42 can be readily maintained or serviced due to its being readily accessible adjacent the exterior side of the conveyor side rail, and the valve unit and the electrical control unit can each be readily disconnected from the intermediate manifold unit, and quickly replaced if necessary, without requiring that the entire module be removed from the conveyor.

The optical sensor 43 is preferably mounted by a support element (see FIG. 2) to send a beam across and above the rollers 12 and substantially parallel to the axes of the rollers, with the beam being reflected off of a reflector adjacent the other side. If an object or article is present, the beam is broken and in this manner the presence of an article in the zone can be sensed.

When it is desired to provide the conveyor with the capability of "slug" movement so as to permit simultaneous advancing of articles disposed in a plurality of adjacent zones, then the conveyor control system is provided with a slug control module 51 (FIGS. 4 and 5) connected electrically in series at one end of the number of zones defining the slug, and is provided with a slug terminator 54 connected electrically in series at the other end of the number of zones defining the slug.

The slug terminator 54 substantially corresponds to the electrical connector 47 except that the terminator 54 permits electrical transmission therethrough of only the power supply conductor 104 and the ground conductor 106. The slug control conductor 105 does not extend through the slug terminator, thereby creating a break in the slug conductive line.

As to the slug control module 51, it connects to a slug signaling device 52 through an intermediate signal transmitting line 53. The slug signaling device 52 typically comprises some type of switching device, such as a manually or automatically actuated switch, a conventional transistor capable of performing a switching function, or any other type of input which provides a signal equivalent to a switching function. When the slug signal device 52 provides a slug signal or switching function, then the slug control module 51 through its appropriate circuitry causes activation of the valve solenoids 68 coupled to the plurality of control modules 42 which are connected in series with and controlled by the slug module, thereby permitting the rollers in the plurality of zones to be simultaneously driven, as explained in greater detail hereinafter.

The slug module 51 as illustrated in FIGS. 4 and 5 includes a hollow housing which can also be fixedly attached to the conveyor, such as to the side rail, as by fasteners such as screws. The slug control module 51, in the housing thereof, mounts a circuit board 94' (FIG. 10) which is substantially identical to the circuit board 94 associated with the zone control module 42 as shown in FIG. 9. This circuit board 94' again defines the same conductors 101, 102, 103 extending therethrough for connection to connector parts 96 and 97 which in turn join to ends of electrical connectors 47 so that the slug module is connected electrically in series with the electrical units 58 of the zone modules 42. The connector 95 is connected to the slug signaling device 52 through the signal line 53, which signaling device 52 typically comprises some type of switching arrangement, this being diagrammatically illustrated by the switch 126.

Figure 10:
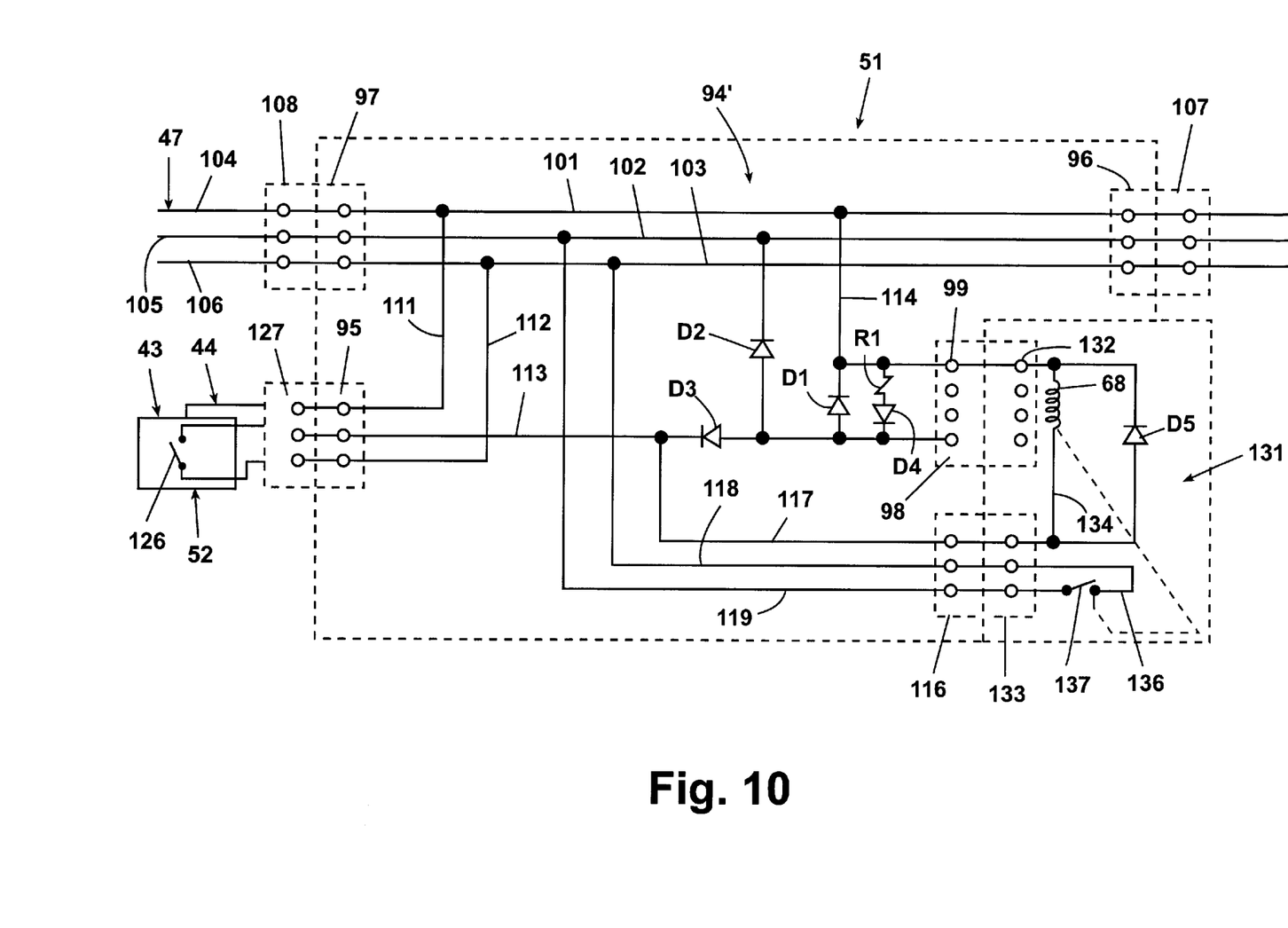
FIG. 10 is a schematic electrical control circuit for a slug module.

The slug control module 51 also mounts therein a second circuit board 131 which defines thereon a pair of electrical connector parts 132 and 133, the latter creating a plug-type engagement with connectors parts 98 and 116, respectively, as defined on the circuit board 94'. The three terminals associated with the connector part 116 of board 94' are joined to conductors 117, 118, 119 which in turn respectively connect to the conductors 113, 103, 102.

The circuit board 131 includes a relay coil 135 which connects via conductor 134 to terminals on the connector parts 132 and 133, which in turn respectively connect to the conductors 114 and 117. The relay coil 135 therein, when energized, causes closure of a normally open relay switch 137, the latter being provided in a conductor 136 associated with the circuit board 131. This conductor 136 in turn is joined to the remaining two terminals of the connector part 133, which two terminals in turn join to the conductors 118, 119 of the circuit board 94'.

In operation, in the absence of a slug signal, the slug switch 126 is normally open, and thus the conductor 114 and the coil 135, while connected between power conductor 101 and conductor 113, are nevertheless isolated from the ground conductor 103 so that the coil 135 remains unenergized, and the relay switch 137 remains open.

When slug operation is desired, the slug switch 126 is closed thereby connecting conductor 113 to ground conductor 103 through intermediate conductor 112. This causes coil 135 to be energized, whereby relay switch 137 is closed, thereby creating a direct connection between the slug line 102 and the ground line 103 on the circuit board 94', which direct connection is transmitted through the intermediate electrical connectors 47 to the serially-connected zone control modules 42. In the individual modules 42, the solenoid coil 68 is now connected through conductor 114 to the power conductor 101, and the solenoid coil 68 is also connected at its other end to the conductor 113 which in turn connects to conductor 139 containing the diode D2 therein. Conductor 139 connects to the slug conductor 102 which extends back to the slug module 51 and is joined through the conductors 118 and 117 to the ground conductor 103. This thus provides a complete circuit so that the solenoid coils 68 associated with the plurality of serially-connected zone modules 42 are thus energized, causing each of the respective valves to be shifted into an open position, and thereby allowing pressurized air to be supplied to all of the pneumatic actuators associated with the plurality of zones defining the slug region. The conveyor rollers in all of the zones are thus rotatably driven so long as the slug switch 126 remains closed. Opening of this latter switch breaks the circuit by de-energizing the relay coil 135 and opening the relay switch 137 of the slug module 51, and thereby causing de-energization of the solenoid coils 68 associated with the respective zone control modules 42. Of course, if the sensor switch 121 associated with any of the zone control modules 42 is in a position effecting closure between the conductors 112 and 113, then those specific control modules 42 will remain energized until the respective sensor switch 121 returns to its open position.

Figure 9:
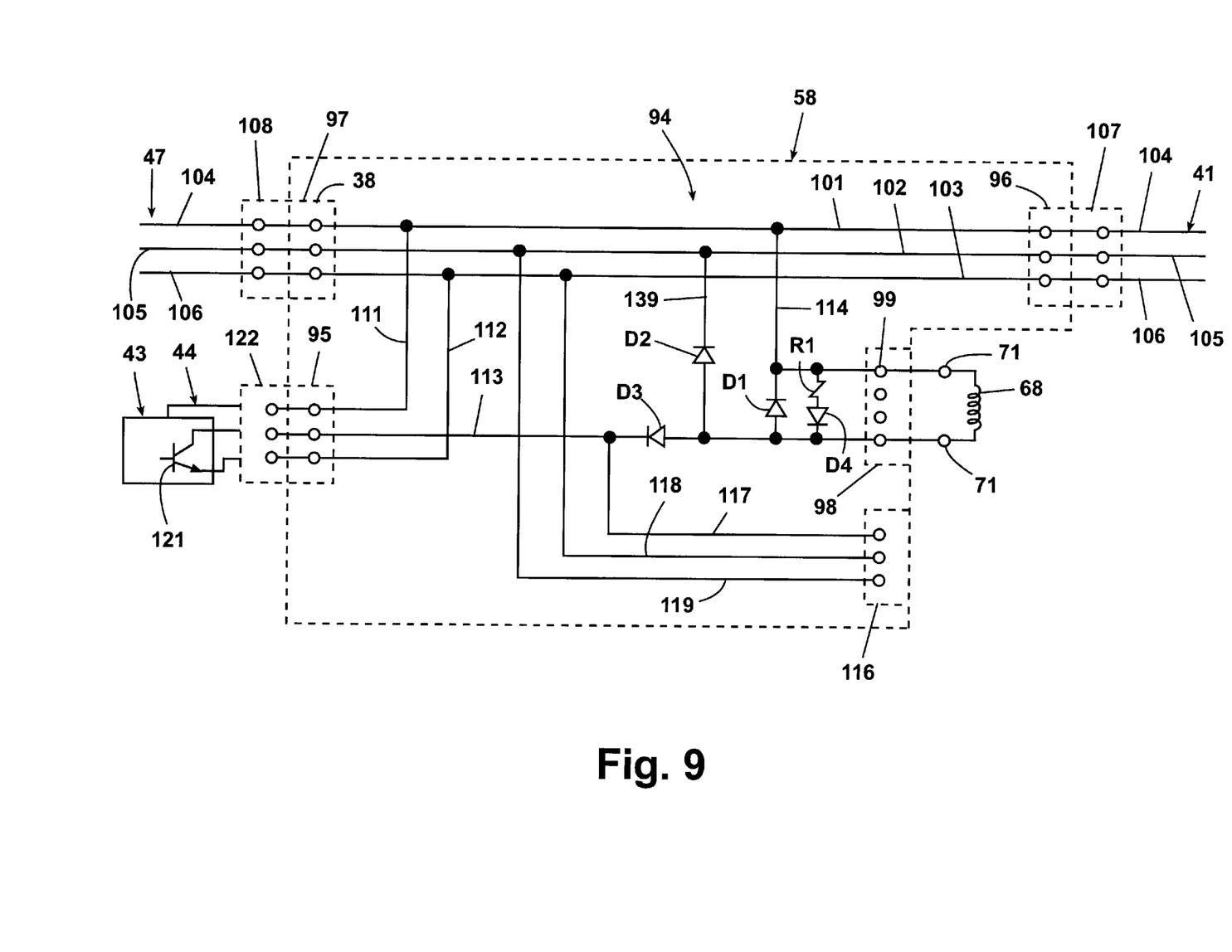
FIG. 9 is a schematic electrical control circuit for the zone control module.

Diodes D1 in FIGS. 9 and 10 and diode D5 in FIG. 10 are present to merely prevent back voltages or currents from skewing operation of electrical control circuits.

Slug module 51 does not have a valve unit 56, or a manifold unit 57. Also, slug module 51 can be mounted below or between zone control modules 42 because of the lack of connection to fluid supply lines. Slug module 51 merely must be connected in series with the zone control modules 42, such as via electrical connector lines 47.

While the modules 42 and 51 are illustrated in FIGS. 9 and 10 as having separable connector parts 96, 107 and 97, 108 for electrically joining the flexible electrical connectors 47 to the modules, it will be appreciated that at least one of connections 96, 107 or 97, 108 could be permanent if desired so that the connector 47 would thus remain attached to a respective module.

The circuits of FIGS. 9 and 10 are merely a preferred circuit arrangement for implementing the invention. Other circuits including various elements having equivalent functions to the elements set forth in FIGS. 9 and 10 are known in the art.

While rollers 12 are described throughout the invention as the conveyor zone transporting members, other approaches are known and are within the scope of the invention. For example, a series of endless conveyor belts corresponding to the zones being controlled can be positioned on drive shafts or drive rollers and driven to move the articles.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A zone control module for a conveyor control system comprising:
    a manifold unit for receiving and transmitting fluid pressure therethrough, said manifold unit having first and second exterior surfaces;

a valve unit fixedly but detachably mounted to the first surface of said manifold unit, said valve unit including an electrical valve actuator and a movable valve element, said movable valve element being in fluid communication with said manifold unit, said electrical valve actuator moving said valve element to control flow of fluid passing therethrough;

an electrical control unit fixedly but detachably mounted to the second surface of said manifold unit; and a pair of electrical conductors connected between said valve and control units for sending electricity to power said electrical valve actuator.

2. The zone control module of claim 1, wherein said pair of conductors extend through said manifold unit and each includes a separable plug-socket connection to permit separation between said valve and control units.

3. The zone control module of claim 2, wherein said manifold unit is sandwiched between said valve and control units.

4. The zone control module of claim 2, wherein each said conductor includes first, second and third conductor parts which are fixed to said valve unit, manifold unit and control unit, respectively, said first and third conductor parts being separably electrically joined to said second connector part.

5. The zone control module of claim 2, wherein said conductors include a pair of pin elements extending outwardly from said valve unit in alignment with apertures formed in said manifold unit.

6. The zone control module of claim 1, wherein said control unit has an electrical connector connected to an optical object sensor.

7. The zone control module of claim 1, wherein said valve unit transmits fluid pressure to an actuator apparatus for drive rollers of the conveyor system.

8. The zone control module of claim 1, wherein said electrical valve actuator comprises a solenoid.

9. The zone control module of claim 1, wherein said manifold unit is fixedly secured to a rail member of a conveyor system.

10. A conveyor control system for use in a conveyor system having spaced rail members supporting a plurality of article driving members therebetween, said driving members defining at least first and second adjacent zones each having a respective said driving member, and first and second pneumatic actuator devices respectively associated with said first and second zones for effecting driving of the respective driving member, comprising:

a sensor for sensing the absence of an article in said second zone;

a manifold unit for receiving and transmitting therethrough pressurized air from an air pressure source, said manifold unit being directly mounted to an outer side of one said rail member of said conveyor system;

a valve unit including a shiftable valve and a solenoid actuator to shift said valve into a position to allow passage of pressurized air from the manifold unit through the valve to activate said first pneumatic actuator device, said valve unit being detachably mounted directly to said manifold unit;

an electrical control unit for receiving a signal from said sensor and for energizing said solenoid actuator of said valve unit to shift said valve in response to said sensor sensing the absence of an article in the second zone, said electrical control unit being detachably mounted directly to said manifold unit; and said conveyor control system providing access and removal capability of said valve unit and said electrical control unit without removing said manifold unit from said rail member.

11. A conveyor control system according to claim 10, wherein said manifold unit includes a housing which fixedly mounts thereon a pair of electrically conductive members which at one end have a separable pluglike electrical engagement which said valve unit and which at the other end have a separable pluglike electrical engagement with said electrical control unit.

12. A conveyor control system for use in a conveyor having a plurality of drive rollers divided into a plurality of adjacent zones each having a pressure fluid controlled actuator for the respective drive rollers, and a sensor for each of the zones for sensing the absence of a load in the respective zone, said conveyor control system comprising:

a power supply;

a group of zone control modules electrically connected in series relationship to each other and said power supply, each said zone control module corresponding to a respective said zone and including a movable valve which is actuated in response to a sensed condition in an adjacent downstream zone such that drive rollers are actuated in the zone immediately upstream from the adjacent downstream zone;

electrical connectors connecting said control modules to each other in series; and a slug module electrically connected in series to said zone control modules and said power supply, said slug module upon receiving a slug activating signal causing overriding of the sensed condition for each of said zone control modules of said group and actuating the valves of the group of control modules to causing driving of said rollers in each of the corresponding zones.

13. The conveyor control system of claim 12, wherein said electrical connectors serially connecting said zone control modules each include a positive voltage conductor, a ground conductor and a slug signal conductor.

14. The conveyor control system of claim 13, including a slug terminator connector, said slug terminator connector serially connecting one of said zone control modules of said group to another said zone control module which is not part of said group, said slug terminator connector including an open circuit in said slug signal conductor, said slug module being connected in series with said group of control modules at one end thereof, said slug terminator connector being connected in series to said group of control modules at the other end thereof and including only said positive voltage conductor and said ground conductor.

15. The conveyor control system of claim 14, wherein each of said zone control modules is connected to a fluid pressure source, and said zone control modules supplying fluid pressure to the respective valves in response to a slug signal received by said slug module.

* * * * *